US011182483B2

(12) United States Patent
Minamikawa (10) Patent No.: US 11,182,483 B2
(45) Date of Patent: Nov. 23, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Takahiro Minamikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 425 days.

(21) Appl. No.: 16/027,754

(22) Filed: Jul. 5, 2018

(65) Prior Publication Data
US 2019/0026468 A1     Jan. 24, 2019

(30) Foreign Application Priority Data

Jul. 19, 2017   (JP) .............................. JP2017-140088

(51) Int. Cl.
*G06F 21/57*       (2013.01)
*H04L 9/08*        (2006.01)
(Continued)

(52) U.S. Cl.
CPC .............. *G06F 21/57* (2013.01); *G06F 21/34* (2013.01); *G06F 21/608* (2013.01);
(Continued)

(58) Field of Classification Search
CPC ........ G06F 21/57; G06F 21/34; G06F 21/608; H04L 9/0822; H04L 9/0866; H04L 9/0877; H04L 9/0897
See application file for complete search history.

(56) References Cited

U.S. PATENT DOCUMENTS 7,590,867 B2   9/2009  Scarlata et al.
8,190,916 B1 *  5/2012  Wang .................... G06F 21/575
                                                      713/193

(Continued)

FOREIGN PATENT DOCUMENTS

JP        4498416 B2    7/2010
JP        5503594 B2    5/2014
JP        5972924 B2    8/2016

OTHER PUBLICATIONS

"TPM Main Part 1 Design Principles", Specification Version 1.2, Revision 116, https://trustedcomputinggroup.org/wp-content/uploads/TPM-Main-Part-1-Design-Principles_v1.2_rev116_01032011.pdf, Mar. 2011 (Year: 2011).*

*Primary Examiner* — Theodore C Parsons
(74) *Attorney, Agent, or Firm* — Oliff PLC (57) ABSTRACT

An information processing apparatus includes a key cryptographic processor, a retaining unit, a key acquiring unit, and a processor. The key cryptographic processor performs cryptographic processing on a data encryption key used in a cryptographic process on data. The retaining unit retains the data encryption key encrypted by the key cryptographic processor. The key acquiring unit transmits, to an external apparatus, the data encryption key encrypted and acquires the data encryption key decrypted by the external apparatus. The processor performs cryptographic processing on data. The cryptographic processing is performed in such a manner that, when the key cryptographic processor decrypts the data encryption key, the data encryption key decrypted is used, and that, when the key cryptographic processor does not decrypt the data encryption key, the data encryption key acquired by the key acquiring unit is used.

9 Claims, 8 Drawing Sheets

(51) Int. Cl.
*G06F 21/60* (2013.01)
*G06F 21/34* (2013.01)

(52) U.S. Cl.
CPC .......... *H04L 9/0822* (2013.01); *H04L 9/0866* (2013.01); *H04L 9/0877* (2013.01); *H04L 9/0897* (2013.01)

(56) References Cited

U.S. PATENT DOCUMENTS

| | | |
|---|---|---|
| 8,959,363 B2 | 2/2015 | Saripalli |
| 9,405,908 B2 | 8/2016 | Saripalli |
| 2005/0166024 A1* | 7/2005 | Angelo ................. G06F 21/575 711/164 |
| 2008/0046898 A1* | 2/2008 | Molina ............... H04L 63/0442 719/330 |

* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-140088 filed Jul. 19, 2017.

BACKGROUND

Technical Field

The present invention relates to an information processing apparatus and a non-transitory computer readable medium.

SUMMARY

According to an aspect of the invention, there is provided an information processing apparatus including a key cryptographic processor, a retaining unit, a key acquiring unit, and a processor. The key cryptographic processor performs cryptographic processing on a data encryption key used in a cryptographic process on data. The retaining unit retains the data encryption key encrypted by the key cryptographic processor. The key acquiring unit transmits, to an external apparatus, the data encryption key encrypted and acquires the data encryption key decrypted by the external apparatus. The processor performs cryptographic processing on data. The cryptographic processing is performed in such a manner that, when the key cryptographic processor decrypts the data encryption key, the data encryption key decrypted is used, and that, when the key cryptographic processor does not decrypt the data encryption key, the data encryption key acquired by the key acquiring unit is used.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below in detail by referring to the attached drawings. In the figures, components having substantially the same functions are designated with the same reference numerals, and their repeated description will be avoided.

The Overall Configuration of an Information Processing System

Figure 1:
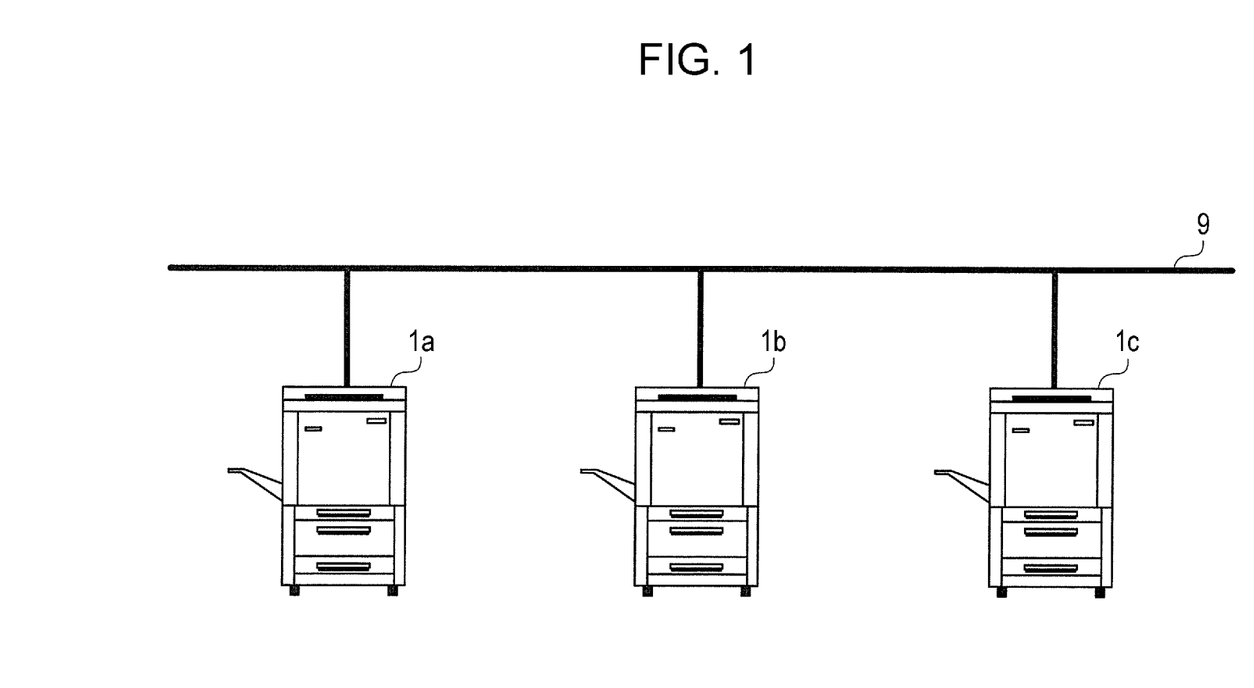
FIG. 1 is a diagram illustrating an exemplary overall configuration of an information processing system according to an exemplary embodiment of the present invention.

FIG. 1 is a diagram illustrating an exemplary overall configuration of an information processing system according to an exemplary embodiment of the present invention.

The information processing system includes an information processing apparatus 1a, an information processing apparatus 1b, and an information processing apparatus 1c which are connected to one another through a communication line 9 such as a local area network (LAN). The information processing apparatuses 1a, 1b, and 1c will be described in detail below. When the information processing apparatuses 1a, 1b, and 1c are not differentiated from one another, the information processing apparatuses 1a, 1b, and 1c are referred to as information processing apparatuses 1. In addition, only three information processing apparatuses are illustrated. However, this is not limiting. The information processing apparatus 1a is an exemplary external apparatus of the information processing apparatus 1b; and the information processing apparatus 1b is an exemplary external apparatus of the information processing apparatus 1a. In the exemplary embodiment, a description will be made by taking an image processing apparatus as an exemplary information processing apparatus 1. However, another type of information processing apparatus may be used.

The Hardware Configuration of an Information Processing Apparatus

Figure 2:
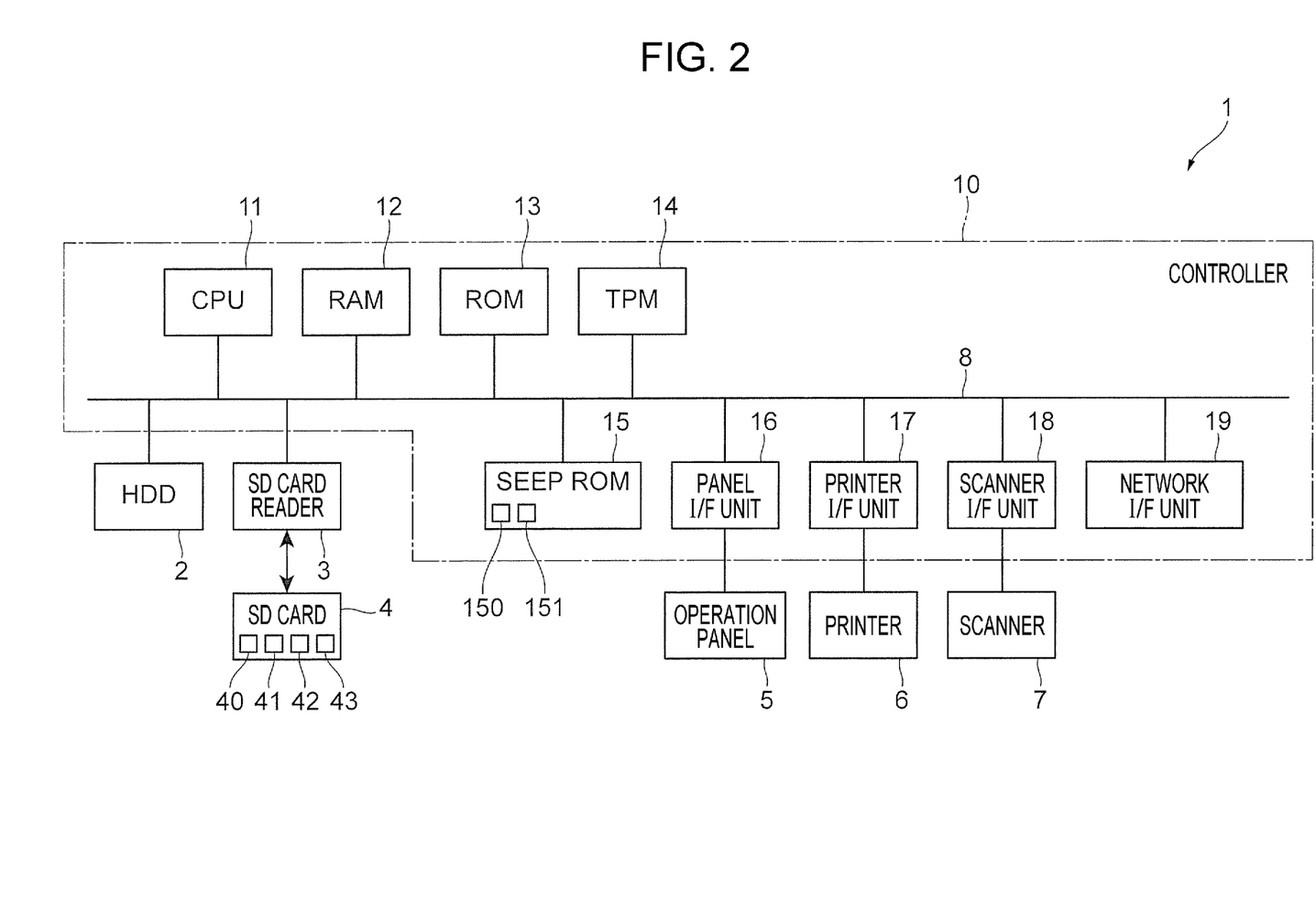
FIG. 2 is a block diagram illustrating an exemplary hardware configuration of an information processing apparatus according to an exemplary embodiment of the present invention.

FIG. 2 is a block diagram illustrating an exemplary hardware configuration of an information processing apparatus 1 according to the exemplary embodiment of the present invention.

The information processing apparatus 1 includes a controller 10 that controls the entire information processing apparatus 1. The controller 10 is connected to a hard disk drive (HDD) 2, a secure digital (SD) card reader 3, an operation panel 5, a printer 6, and a scanner 7 through a bus 8.

The controller 10 includes a central processing unit (CPU) 11, a random access memory (RAM) 12, a read only memory (ROM) 13, a trusted platform module (TPM) 14, a serial electrically erasable programmable read only memory (SEEPROM) 15, a panel input/output (I/F) unit 16, a printer I/F unit 17, a scanner I/F unit 18, and a network I/F unit 19. The components included in the controller 10 are implemented, for example, on a controller board (which may be a motherboard). Therefore, when a component of the controller 10 is out of order, is necessary to replace the entire controller board.

The HDD 2 stores data in such a manner that the data which is a target of encryption has been encrypted. Data to be encrypted is not limited to the data stored in the HDD 2.

The SD card reader 3 writes and reads data in an inserted SD card 4. The SD card 4 is a memory card insertable to the SD card reader 3, and is an exemplary external memory. The information processing apparatus 1 is configured so as not to be operated with the SD card 4 being removed from the SD card reader 3. Therefore, the SD card 4 is, for example, fixed to the controller board by using a jig. However, the SD card 4 may be fraudulently replaced with another SD card 4.

The SD card 4 stores backup data including a TPM access key 41, a TPM internal key 42, and an encrypted data encryption key 43 which are described below, and also stores card identification information for identifying the SD card 4. The encrypted data encryption key 43 is a key obtained by encrypting a data encryption key. The SD card 4 is an exemplary storage medium.

The operation panel 5 has a touch panel display in which a touch panel overlies a display such as a liquid-crystal display. The operation panel 5 displays an operation screen on the display, and receives operations performed on the touch panel by an operator.

The printer 6 has an image carrying body which is, for example, a photoreceptor, and forms, for output, an image on a recording medium such as a sheet of paper. The printer 6 is an exemplary image output unit.

The scanner 7 optically reads image data from a document. The scanner 7 is an exemplary image input unit.

The panel I/F unit 16 is connected to the operation panel 5. The printer I/F unit 17 is connected to the printer 6. The scanner I/F unit 18 is connected to the scanner 7. The network I/F 19 is connected to user terminals, servers, and the like over networks.

The RAM 12 is used to store data temporarily. The ROM 13 is used to store, for example, control programs for controlling the information processing apparatus 1 and the card identification information.

The TPM 14 is a security chip in conformity with the specification defined by the Trusted Computing Group (TCG), and has excellent tamper resistance. The tamper resistance of the TPM 14 is such that, when an attempt to read a stored key-encryption key and the like is made by analyzing the internal of the TPM 14, the TPM 14 is physically damaged so that the key and the like are incapable of being read. The TPM 14 may be more generally construed as a key cryptographic processor. That is, the key cryptographic processor indicates a function of performing cryptographic processing on a data encryption key used in cryptographic processing on data. The TPM 14 may be construed as an example of the key cryptographic processor.

The TPM 14 has at least the following functions.

(a) A function in which an authentication key (hereinafter referred to as a "TPM access key") is necessary in use of the functions of the TPM 14. This function enables a TPM access key to be generated from apparatus specific information 150.

(b) A function of generating, for storage, a key-encryption key (hereinafter referred to as a "TPM internal key") by hierarchically encrypting a data encryption key used in encryption of data. This function enables the key-encryption key to be recovered and also enables the TPM 14 to be returned to the original state.

(c) A self-diagnostic function of checking the state of the TPM 14. The state of the TPM 14 is one of the following states: the state in which the TPM is ready to be used (already-initialized state); the state in which the TPM is not ready to be used (not-initialized state); and the state in which the TPM 14 is incapable of being used (TPM chip failure error).

The SEEPROM 15 is an electrically rewritable nonvolatile memory. In the SEEPROM 15, the apparatus specific information (for example, the serial number or the MAC address) 150 of the information processing apparatus 1 is written in factory shipment or in replacement of the controller board. After the apparatus specific information 150 is written, the SEEPROM 15 is protected so that a user is unable to change the storage information. In addition, when the information processing apparatus 1 is activated the first time, or when the information processing apparatus 1 is activated after replacement of the controller board, a TPM access key 151 generated from the apparatus specific information 150 is written in the SEEPROM 15 by using functions of the TPM 14. The SEEPROM 15 is not necessarily mounted on the controller board. The SEEPROM 15 may be mounted at another position in the information processing apparatus 1.

The Functional Configuration of an Information Processing Apparatus

Figure 3:
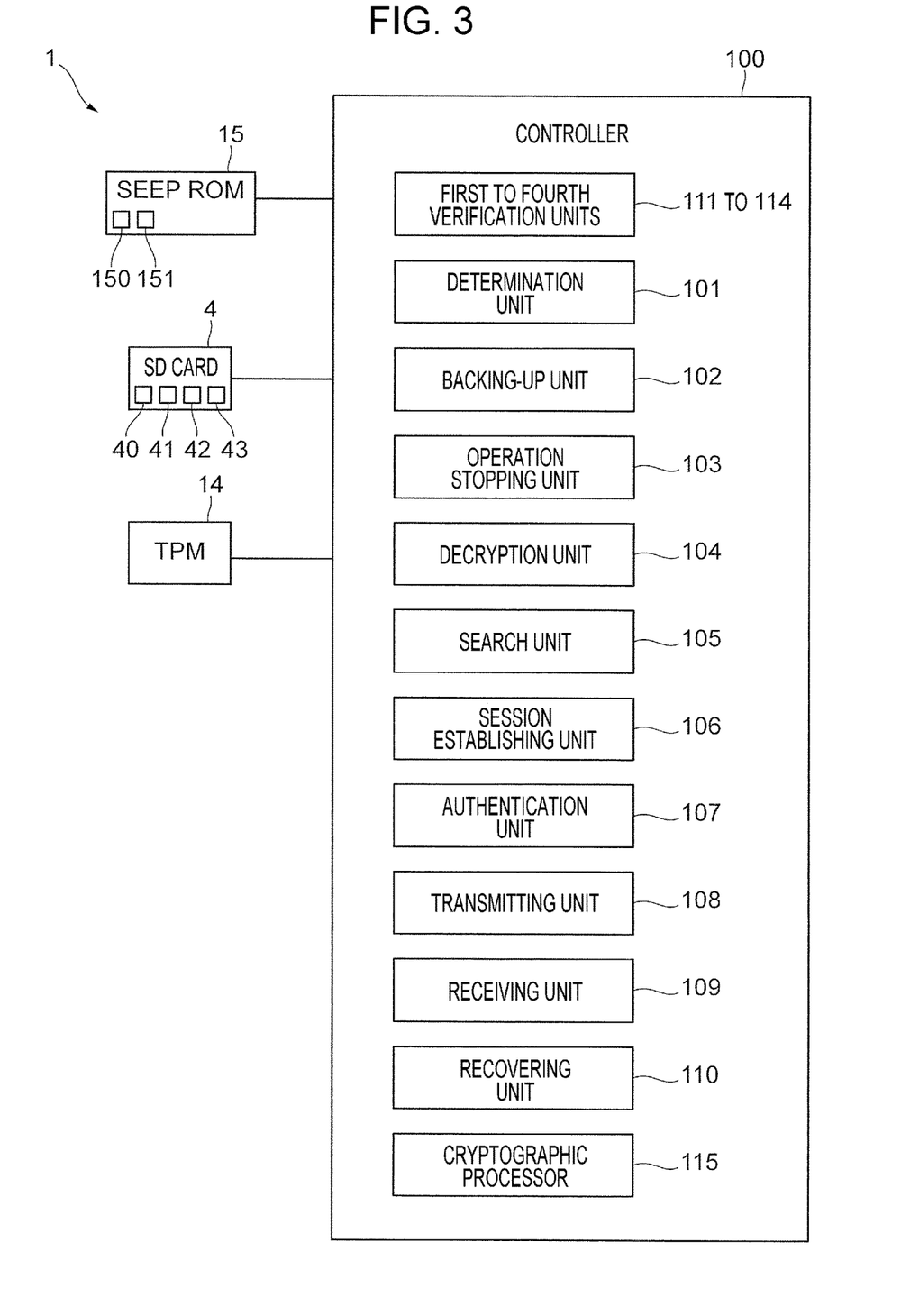
FIG. 3 is a block diagram illustrating functions of an information processing apparatus according to an exemplary embodiment of the present invention.

FIG. 3 is a block diagram illustrating functions of the information processing apparatus 1. As illustrated in FIG. 3, the CPU 11 operates according to the control programs, which are stored in the ROM 13, so as to function as, for example, first to fourth verification units 111 to 114, a determination unit 101, a backing-up unit 102, an operation stopping unit 103, a decryption unit 104, a search unit 105, a session establishing unit 106, an authentication unit 107, a transmitting unit 108, a receiving unit 109, a recovering unit 110, and a cryptographic processor 115.

The determination unit 101 determines whether the TPM 14 is in the already-initialized state, the not-initialized state, or the self-diagnostic error state. When the determination unit 101 determines that the TPM 14 is in the self-diagnostic error state, if the SD card 4 does not store the encrypted data encryption key 43, the determination unit 101 determines that the TPM 14 is in the TPM chip failure error state. In addition, when a request for exclusive use of the TPM 14 is received from a different information processing apparatus 1, the determination unit 101 determines whether or not the information processing apparatus 1 is using the TPM 14.

The backing-up unit 102 backs up, to the SD card 4, the TPM access key 41, the TPM internal key 42, and the encrypted data encryption key 43 which are generated by using functions of the TPM 14. The backing-up unit 102 is an exemplary retaining unit. The TPM internal key 42 exemplary setting data. The encrypted data encryption key 43 is an encrypted data encryption key or an enciphered data encryption key.

The first verification unit 111 verifies the SD card 4 according to whether or not the card identification information obtained from the SD card 4 matches card identification information stored in the ROM 13.

The second verification unit 112 obtains, from the SD card 4, the TPM access key 41 included in the backup data, compares the TPM access key 41 with a TPM access key generated from the apparatus specific information 150, and verifies the TPM access key 41 according to whether or not both the TPM access keys match each other.

When the determination unit 101 determines that the TPM 14 is in the not-initialized state, the third verification unit 113 obtains the TPM internal key 42 from the SD card 4, and verifies the TPM internal key 42 according to whether or not the state of the TPM 14 may be recovered from the TPM internal key 42 by using functions of the TPM 14.

When the determination unit 101 determines that the TPM 14 is in the already-initialized state, the fourth verification unit 114 obtains the encrypted data encryption key 43 from the SD card 4, and verifies the encrypted data encryption key 43 according to whether or not a data encryption key may be recovered from the encrypted data encryption key 43 by using functions of the TPM 14.

In the case where the first verification unit 111 determines that the SD card 4 is invalid, where the second verification unit 112 determines that the TPM access key 41 is invalid, where the third verification unit 113 determines that the TPM internal key 42 is invalid, or where the fourth verification unit 114 determines that the encrypted data encryption key 43 is invalid, the operation stopping unit 103 stops the subsequent operations of the information processing apparatus 1.

The decryption unit 104 reads the encrypted data encryption key 43 from the SD card 4, and decrypts the read encrypted data encryption key 43 by using functions of the TPM 14. The decryption unit 104 is an exemplary external-key decryption unit.

The search unit 105 searches for different information processing apparatuses 1 that are present in the networks connected to the information processing apparatus 1.

The session establishing unit 106 starts a cryptographic communication session with a different information processing apparatus 1.

The authentication unit 107 requests a different information processing apparatus 1 to authenticate the information processing apparatus 1, and determines whether or not the authentication performed by the different information processing apparatus 1 has succeeded.

The transmitting unit 108 transmits, to a different information processing apparatus 1, a request for exclusive use of the TPM 14 of the different information processing apparatus 1, a request for decryption of the encrypted data encryption key 43, and a request for cancellation of the exclusive use of the TPM 14 of the different information processing apparatus 1. In addition, the transmitting unit 108 transmits, to a different information processing apparatus 1, a response to the request for exclusive use of the TPM 14 and a data encryption key obtained by decrypting the encrypted data encryption key 43. The transmitting unit 108 is an exemplary function, of a key acquiring unit, for transmitting an encrypted data encryption key, or is an exemplary transmitting unit.

The receiving unit 109 receives, from a different information processing apparatus 1, the response to the request for exclusive use of the TPM 14 of the different information processing apparatus 1 and the data encryption key obtained by decrypting the encrypted data encryption key 43. In addition, the receiving unit 109 receives, from a different information processing apparatus 1, the request for exclusive use of the TPM 14, the request for decryption of the encrypted data encryption key 43, and the request for cancellation of the exclusive use of the TPM 14. The receiving unit 109 is an exemplary function, of the key acquiring unit, for obtaining a decrypted data encryption key.

Upon reception of a request for exclusive use of the TPM 14 from a different information processing apparatus 1, the recovering unit 110 initializes the TPM 14, and then recovers the TPM 14 by using the backup TPM internal key 42 received with the request. Upon reception of a request for cancellation of the exclusive use of the TPM 14 from the different information processing apparatus 1, the recovering unit 110 initializes the TPM 14, and then recovers the TPM 14 by using the backup TPM internal key 42 stored in the SD card 4. The recovering unit 110 is an exemplary setting unit that sets the state of the key cryptographic processor so that the state of the key cryptographic processor accords with the state of the key cryptographic processor of an external apparatus. The expression, "set the state of the key cryptographic processor so that the state of the key cryptographic processor accords with the state of the key cryptographic processor of an external apparatus", means that a setting operation is performed so that the external apparatus is allowed to use the key cryptographic processor. This includes, for example, recovering the key cryptographic processor by using the key-encryption key included in the key cryptographic processor of the external apparatus.

The cryptographic processor 115 performs cryptographic processing on data in the HDD 2. The cryptographic processing indicates various types of processing about data cryptography. The cryptographic processing includes, for example, encryption and decryption. The cryptographic processor 115 is an exemplary processor.

Operations of an Information Processing Apparatus

Figure 4A:
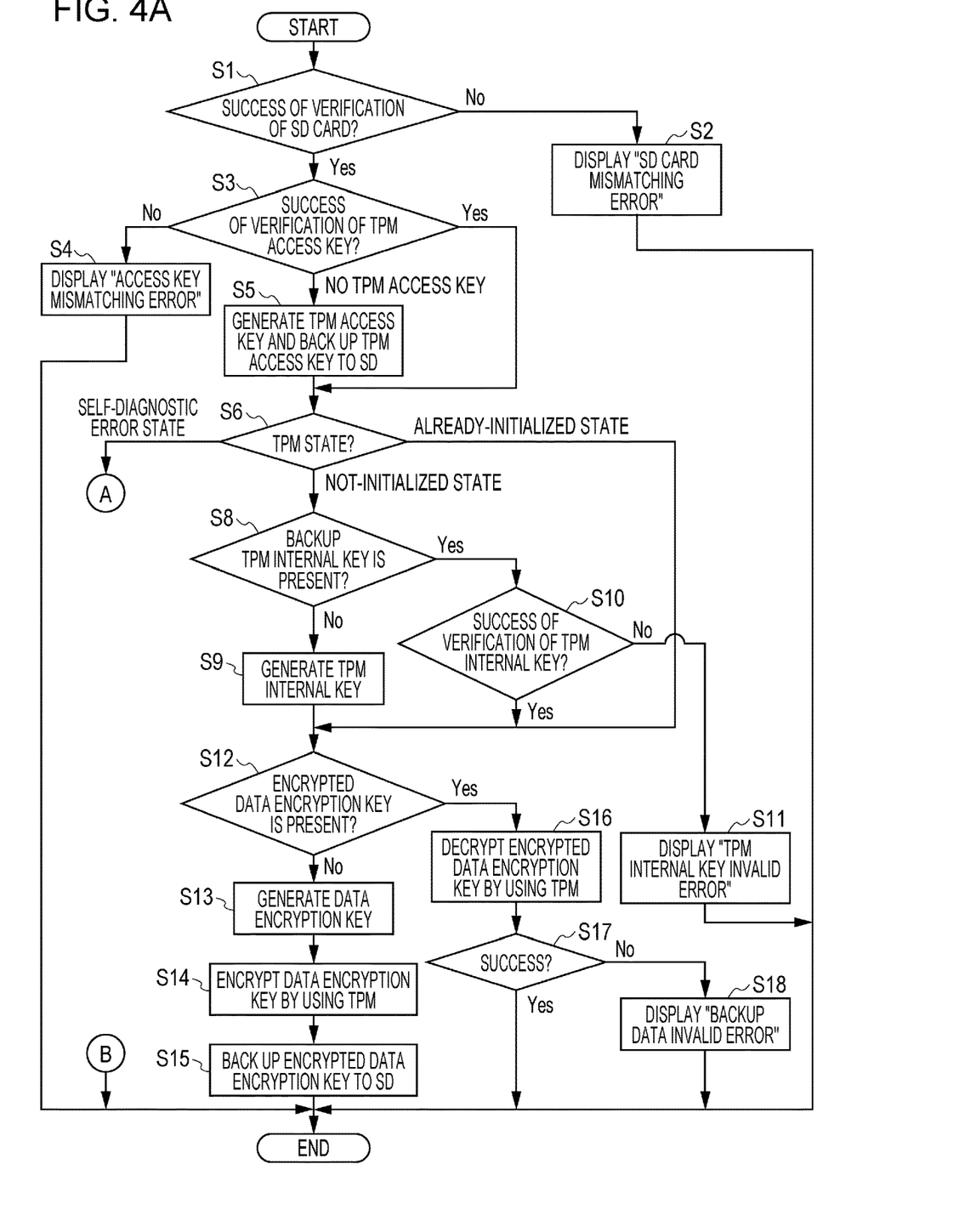
FIG. 4A is a flowchart of an exemplary operation performed when an information processing apparatus is activated, according to an exemplary embodiment.
Figure 4B:
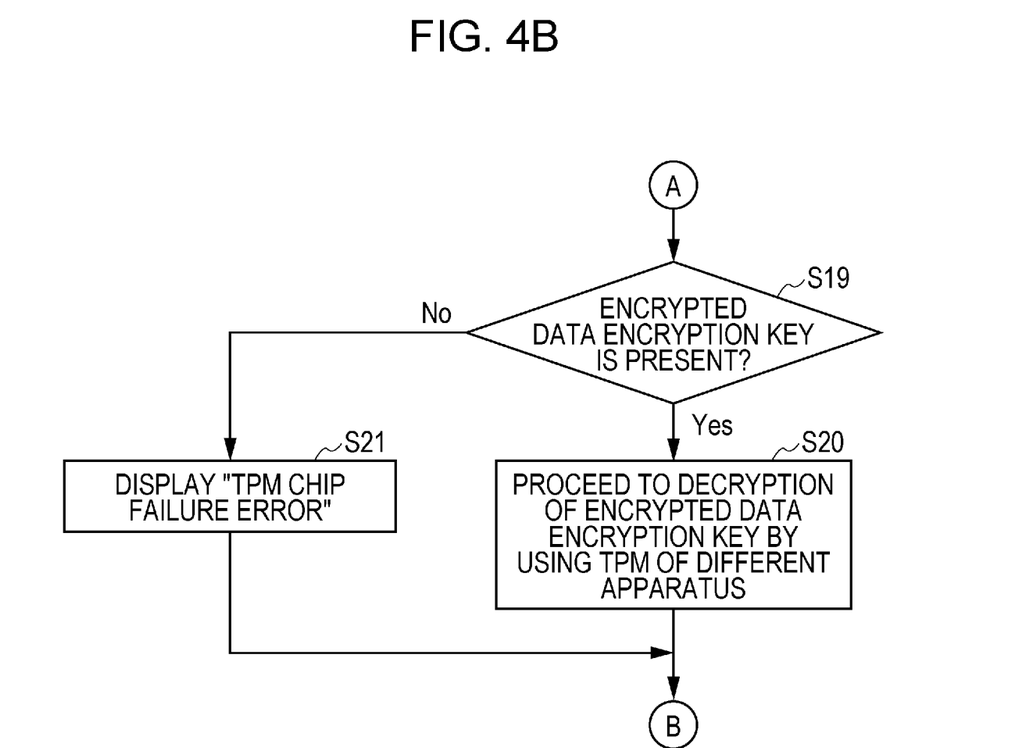
FIG. 4B is a flowchart of an exemplary operation performed when an information processing apparatus is activated, according to an exemplary embodiment.

FIGS. 4A and 4B are flowcharts of an exemplary operation performed when an information processing apparatus 1 is activated. A description will be made under the assumption that the information processing apparatus 1a in FIG. 1 is activated. In this case, the information processing apparatus 1a is an exemplary second information processing apparatus.

An exemplary operation illustrated in FIG. 4A will be described.

Verification of the SD Card

When the information processing apparatus 1a is activated, the first verification unit 111 verifies the SD card 4 (S1). That is, the first verification unit 111 obtains card identification information 40 from the SD card 4, and determines whether or not the obtained card identification information 40 matches the card identification information stored in the ROM 13.

If both the pieces of information match each other and the verification succeeds (Yes in S1), the first verification unit 111 determines that the SD card 4 is valid-If both the pieces of information do not match each other and the verification fails (No in S1), the first verification unit 111 determines that the SD card 4 is invalid, and displays "SD card mismatching error" on the operation panel 5 (S2). The operation stopping unit 103 stops the subsequent operations of the information processing apparatus 1a. If the original SD card 4 of the information processing apparatus 1a is fraudulently replaced with the SD card 4 of an information processing apparatus 1 different from the information processing apparatus 1a, it may be determined that the SD card 4 is invalid in this step. In this case, in order to use the information processing apparatus 1a normally again, replacement with the original SD card 4 is necessary.

Verification of the TPM Access Key

If verification of the SD card 4 has succeeded (Yes in S1), the second verification unit 112 verifies the TPM access key 41 having been backed up to the SD card 4 (S3). That is, the second verification unit 112 obtains TPM access key 41 having been backed up to the SD card 4. Then, the second verification unit 112 obtains the TPM access key 151 written in the SEEPROM 15. The second verification unit 112 determines whether or not the TPM access key 41 obtained from the SD card 4 matches the TPM access key 151 obtained from the SEEPROM 15.

In step S3, if both the keys do not match each other and the verification fails (No in S3), the second verification unit 112 displays "access key mismatching error" on the operation panel 5 (S4). The operation stopping unit 103 stops the subsequent operations of the information processing apparatus 1a. If the original SD card 4 of the information processing apparatus 1a is fraudulently replaced with the SD card 4 of an information processing apparatus 1 different from the information processing apparatus 1a, it may be determined that the SD card 4 is invalid in this step. In this case, in order to use the information processing apparatus 1a normally again, replacement with the original SD card 4 is necessary.

In step S3, if the TPM access key 151 has not been written in the SEEPROM 15 (NO ACCESS KEY in S3), the backing-up unit 102 generates, by using functions of the TPM 14, the TPM access key 151 from the apparatus specific information 150 written in the SEEPROM 15, and writes the TPM access key 151 in the SEEPROM 15. In addition, the backing-up unit 102 backs up the TPM access key 41 as backup data to the SD card 4 (S5). In the case where the information processing apparatus 1a is activated the first time, or where the information processing apparatus 1a is activated after replacement of the controller board, the TPM access key 151 has not been written in the SEEPROM 15. Therefore, the TPM access key 151 is written in the SEEPROM 15, and the TPM access key 41 is backed up to the SD card 4.

In step S3, if both the keys match each other and the verification succeeds (Yes in S3), the process proceeds to the next process (S6).

Determination of the TPM State

The determination unit. 101 determines the state of the TPM 14 (S6). That is, the determination unit 101 determines the state of the TPM 14 by using the self-diagnostic function of the TPM 14.

If the result of the determination in step S6 indicates the self-diagnostic error state (SELF-DIAGNOSTIC ERROR STATE in S6), the determination unit 101 causes the process to proceed to the process in FIG. 4B because the TPM 14 is not usable due to some reason.

When the information processing apparatus 1a is activated the first time, or just after the controller board is replaced, the TPM 14 is in the not-initialized state. If the result of the determination in step S6 indicates the not-initialized state (NOT-INITIALIZED STATE in S6), the third verification unit 113 checks if the backup TPM internal key 42 is present in the SD card 4 (S8).

If the TPM internal key 42 has not been backed up to the SD card 4 (No in S8), that is, when the information processing apparatus 1a is activated the first time, the backing-up unit 102 generates the TPM internal key 42 by using functions of the TPM 14 and backs up the TPM internal key 42 to the SD card 4 (S9).

If the TPM internal key 42 has been backed up to the SD card 4 (Yes in S8), that is, when the information processing apparatus 1a is activated after replacement of the controller board, the third verification unit 113 verifies the backup TPM internal key 42 (S10). Since the existing SD card 4 is used in replacement of the controller board, the TPM internal key 42 has been backed up to the SD card 4.

That is, the third verification unit 113 determines whether or not, by using functions of the TPM 14, the state of the TPM 14 may be recovered from the TPM internal key 42 having been backed up to the SD card 4. If the recovery succeeds, the verification succeeds (Yes in S10). Then, the process proceeds to the next process (S12).

If the recovery fails, the verification fails (No in S10). Then, the third verification unit 113 displays "TPM internal key invalid error" on the operation panel 5 (S11). The operation stopping unit 103 stops the subsequent operations of the information processing apparatus 1a. In this case, in order to use the information processing apparatus 1a normally again, replacement with the original SD card 4 is necessary.

If the result of the verification in step S6 indicates the already-initialized state (ALREADY-INITIALIZED STATE in S6), the process proceeds to the next process (S12).

Check of Presence of the Encrypted Data Encryption Key

The fourth verification unit 114 checks if the encrypted data encryption key 43 is present in the SD card 4 (S12). When the information processing apparatus 1a is activated the first time, the encrypted data encryption key 43 has not been backed up to the SD card 4 (No in S12). The backing-up unit 102 generates a new data encryption key by using a random bit generator or the like (S13). In addition, the backing-up unit 102 encrypts the data encryption key by using functions of the TPM 14 (S14), and backs up the encrypted data encryption key 43 obtained through the encryption to the SD card 4 (S15).

If the encrypted data encryption key 43 has been backed up to the SD card 4 (Yes in S12), the fourth verification unit 114 decrypts the encrypted data encryption key 43 by using functions of the TPM 14 (S16). If the decryption fails (No in S17), the backup data may be tampered. Therefore, message, "backup data invalid error", is displayed on the operation panel 5 (S18), and the operation stopping unit 103 stops the subsequent operations of the information processing apparatus 1a. In this case, in order to use the information processing apparatus 1a normally again, replacement with the original SD card 4 is necessary. If the decryption has succeeded (Yes in S17), the subsequent operations may be continued.

An exemplary operation illustrated in FIG. 4B will be described.

The determination unit 101 checks if the encrypted data encryption key 43 is present in the SD card 4 (S19). If the encrypted data encryption key 43 has been backed up to the SD card 4 (Yes in S19), the determination unit 101 causes the process to proceed to the process (in FIG. 5) of decrypting the encrypted data encryption key 43 by using the TPM 14 of a different information processing apparatus 1 (S20). At that time, the determination unit 101 records the "TPM chip failure error", but makes the system still active. The "TPM chip failure error" is recorded. Thus, the controller board is replaced as soon as the replacement is ready. If the encrypted data encryption key 43 has not been backed up to the SD card 4 (No in S19), the determination unit 101 displays "TPM chip failure error" on the operation panel 5 (S21). The operation stopping unit 103 stops the subsequent operations of the information processing apparatus 1a. In this case, in order to make the information processing apparatus 1a active again, replacement of the controller board is necessary. Accordingly, even if the information processing apparatus 1 is in the self-diagnostic error state, the TPM 14 of a different information processing apparatus 1 may be used, achieving reduction in the downtime until replacement of the controller board.

Figure 5:
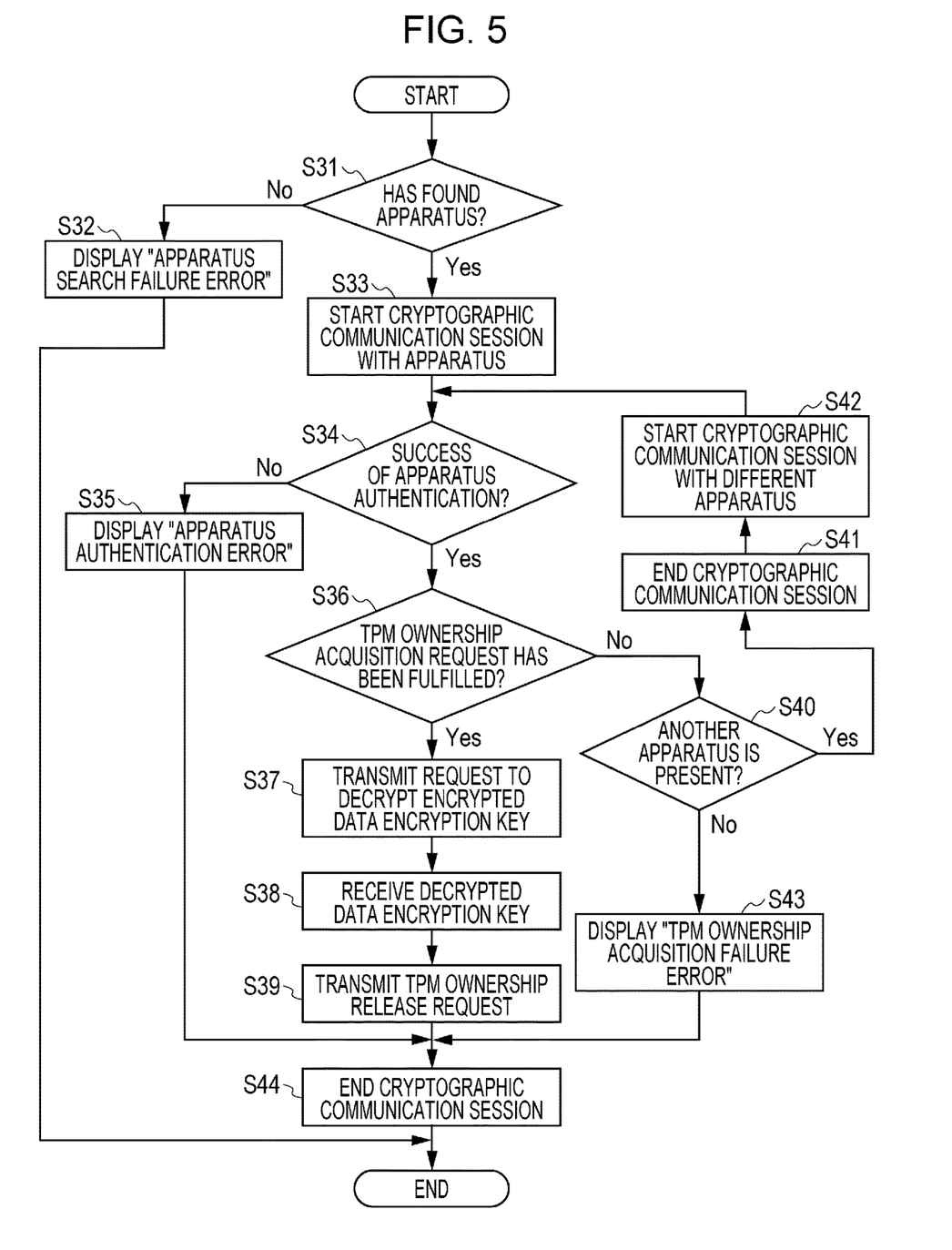
FIG. 5 is a flowchart of an exemplary operation performed when a request for decryption of an encrypted data encryption key by using a trusted platform module (TPM) of an information processing apparatus different from an information processing apparatus according to an exemplary embodiment is made.

FIG. 5 is a flowchart of an exemplary operation performed when the information processing apparatus 1 requests that the encrypted data encryption key 43 be decrypted by using the TPM 14 of a different information processing apparatus 1.

Search for an Apparatus

When the process starts, the search unit 105 searches for different information processing apparatuses 1 which are present in the networks connected to the information processing apparatus 1a, by using a typical printer search protocol (S31). That is, the search unit 105 determines whether or not different information processing apparatuses 1 have been found in the networks connected to the information processing apparatus 1*a*.

In step S31, if no different information processing apparatuses 1 have been found (No in S31), the search unit 105 displays "apparatus search failure error" on the operation panel 5 (S32). The operation stopping unit 103 stops the subsequent operations of the information processing apparatus 1*a*.

In step S31, if different information processing apparatuses 1 have been found (Yes in S31), the process proceeds to the next process (S33).

Start of a Cryptographic Communication Session with a Different Apparatus

The session establishing unit 106 starts a cryptographic communication session with one of the found information processing apparatuses 1 (for example, the information processing apparatus 1*b*) (S33). That is, the session establishing unit 106 uses a cryptographic communication technique, such as Secure Sockets Layer (SSL)/Transport Layer Security (TLS) or IP security (IPSEC), which depends on a communication protocol for a TPM ownership acquisition request described below, to start a cryptographic communication session. This enables a data encryption key having been decrypted by using a TPM to be protected from exposure on a communication path.

Apparatus Authentication Request

When a cryptographic communication session starts, the authentication unit 107 requests the information processing apparatus 1*b* to authenticate the information processing apparatus 1*a* (S34). That is, the authentication unit 107 determines whether or not the authentication by the information processing apparatus 1*b* has succeeded. The information processing apparatus 1*b* having received the request authenticates the information processing apparatus 1*a* on the basis of authentication information and a digital certificate which are transmitted with the request. For example, the information processing apparatus 1*b* performs authentication by storing, in advance in the apparatus, authentication information of reliable apparatuses and issuer certificates. In SSL/TLS or IPSEC, this procedure is included in the negotiation procedure for establishment of a cryptographic communication session. This may inhibit an unauthorized party from abusing the TPM 14.

In step S34, if the authentication performed by the information processing apparatus 1*b* has failed (No in S34), the authentication unit 107 displays "apparatus authentication error" on the operation panel 5 (S35). The operation stopping unit 103 stops the subsequent operations of the information processing apparatus 1*a*. In this case, the session establishing unit 106 ends the cryptographic communication session (S44).

In step S34, if the authentication performed by the information processing apparatus 1*b* has succeeded (Yes in S34), the process proceeds to the next process (S36).

TPM Ownership Acquisition Request

The transmitting unit 108 transmits, to the information processing apparatus 1*b*, a request for exclusive use of the TPM 14 of the information processing apparatus 1*b* (hereinafter referred to as a "TPM ownership acquisition request") (S36). That is, the transmitting unit 108 determines whether or not the request for exclusive use of the TPM 14 of the information processing apparatus 1*b* has been fulfilled. Ordinarily, the TPM 14 is exclusively used by the information processing apparatus 1 including the TPM 14. That is, the TPM internal key 42 is specific to the information processing apparatus 1. In order to cause the TPM 14 of the information processing apparatus 1*b* to enter the state in which the information processing apparatus 1*a* exclusively uses the TPM 14, recovery using the TPM internal key 42 is necessary. Therefore, the transmitting unit 108 transmits, to the information processing apparatus 1*b*, the backup TPM internal key 42 with the request. The operations performed by the information processing apparatus 1*b* having received the request will be described by referring to the flowchart in FIG. 6.

In step S36, if the TPM ownership acquisition request has been fulfilled (Yes in S36), the transmitting unit 108 further transmits a request for decryption of the encrypted data encryption key 43 (S37). The information processing apparatus 1*b* having received the decryption request decrypts the encrypted data encryption key 43 by using the TPM 14. The receiving unit 109 receives a data encryption key obtained through the decryption (S38.

TPM Ownership Release Request

The transmitting unit 108 transmits, to the information processing apparatus 1*b*, a request for cancellation of the exclusive use of the TPM 14 of the information processing apparatus 1*b* (hereinafter referred to as a "TPM ownership release request") (S39). The operations performed by the information processing apparatus 1*b* having received the request will be described by referring to the flowchart in FIG. 7. After the TPM ownership release request is transmitted, the session establishing unit 106 ends the cryptographic communication session (S44).

Search for a Different Apparatus

In step S36, if the TPM ownership acquisition request has not been fulfilled (No in S36), the session establishing unit 106 determines whether or not a further different information processing apparatus 1 other than the different information processing apparatus 1 that is found in step S31 is present in the networks connected to the information processing apparatus 1*a* (S40).

In step S40, if a further different information processing apparatus 1 (for example, the information processing apparatus) is present (Yes in S40), the session establishing unit 106 ends the cryptographic communication session with the information processing apparatus 1*b* (S41). Then, the session establishing unit 106 starts a cryptographic communication session with the information processing apparatus 1*c* (S42). When the cryptographic communication session is started, the authentication unit 107 requests the information processing apparatus 1*c* to authenticate the information processing apparatus 1*a* (S34). If the authentication performed by the information processing apparatus 1*c* has succeeded, similarly to the above-described process, an attempt to acquire the ownership of the TPM 14 is made.

In step S40, if a further different information processing apparatus 1 is not present (No in S40), the session establishing unit 106 displays "TPM ownership acquisition failure error" on the operation panel 5 (S43). The operation stopping unit 103 stops the subsequent operations of the information processing apparatus 1*a*. In this case, the session establishing unit 106 ends the cryptographic communication session (S44).

Figure 6:
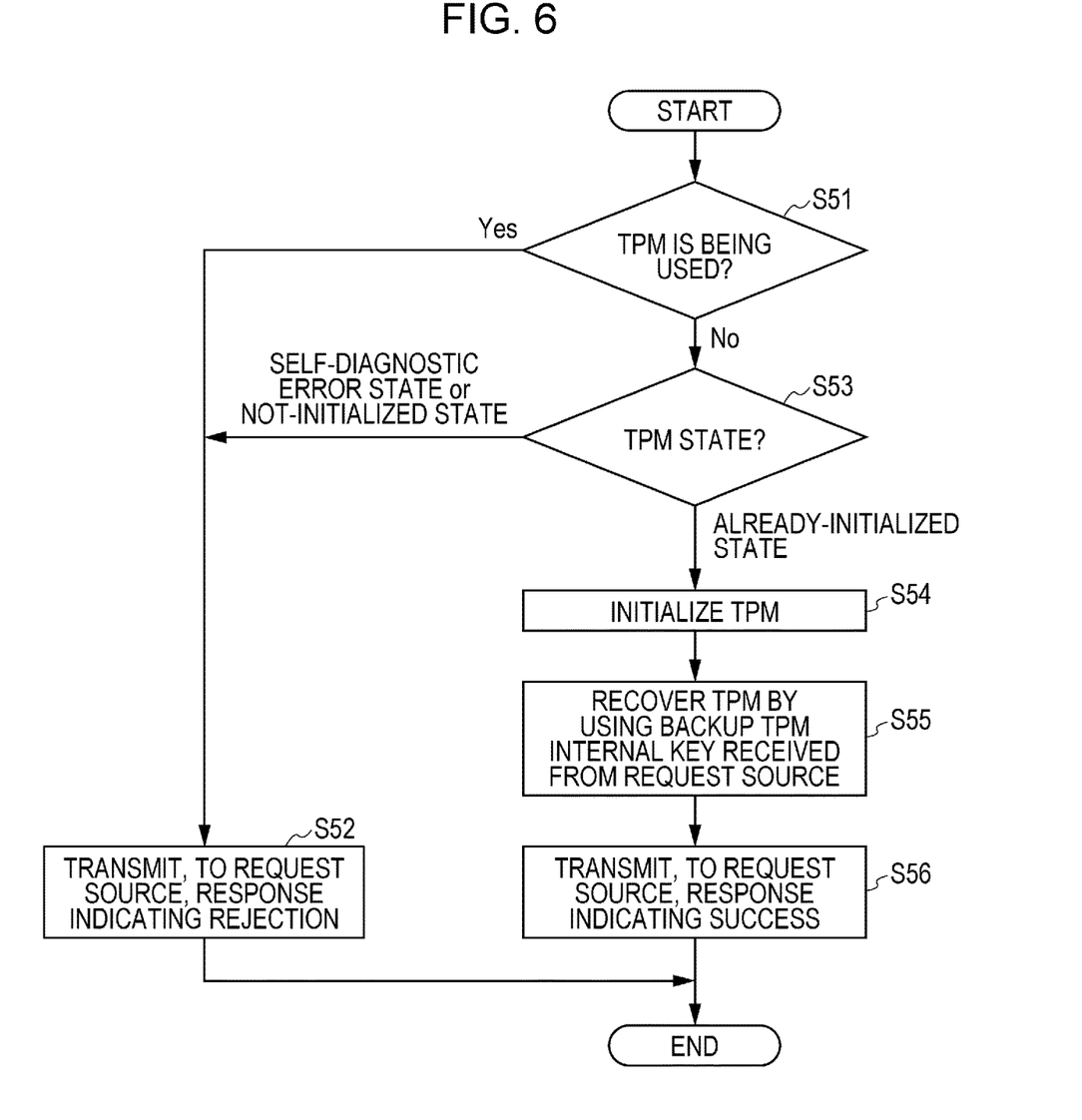
FIG. 6 is a flowchart of an exemplary operation performed when a TPM ownership acquisition request is received from a different information processing apparatus, according to an exemplary embodiment.

FIG. 6 is a flowchart of an exemplary operation performed by a different information processing apparatus 1 (for example, the information processing apparatus 1*b*) having received a TPM ownership acquisition request from the information processing apparatus 1*a*. In this case, the information processing apparatus 1*b* is an exemplary first information processing apparatus.

Determination as to Whether or not the TPM is being Used

Upon reception of a TPM ownership acquisition request from the information processing apparatus 1a, the determination unit 101 determines whether or not the information processing apparatus 1b is using the TPM 14 (S51). That is, the determination unit 101 determines whether or not the information processing apparatus 1b is accessing the TPM 14, that is, for example, the information processing apparatus 1b is being activated.

In step S51, if the information processing apparatus 1b is using the TPM 14 (Yes in S51), it is not possible to release the TPM 14. Therefore, the transmitting unit 108 transmits, to the information processing apparatus 1a, response indicating rejection of the request (S52). In addition, although FIG. 6 does not explicitly illustrate the following case, also in the case where the information processing apparatus 1b does not include the TPM 14, the transmitting unit 108 transmits, to the information processing apparatus 1a, a response indicating rejection of the request.

In step S51, if the information processing apparatus 1b is not using the TPM 14 (No in S51), the process proceeds to the next process (S53).

Determination of the TPM State

The determination unit 101 determines the state of the TPM 14 (S53). That is, the determination unit 101 determines the state of the TPM 14 by using the self-diagnostic function of the TPM 14.

If the result of the determination in step S53 indicates the self-diagnostic error state or the not-initialized state (SELF-DIAGNOSTIC ERROR STATE or NOT-INITIALIZED STATE in S53), the transmitting unit 108 transmits, to the information processing apparatus 1a, a response indicating rejection of the request (S52).

Only if the result of the determination in step S53 indicates the already-initialized state (ALREADY-INITIALIZED STATE in S53), the determination unit 101 causes the process to proceed to the process of allowing the information processing apparatus 1a to use the TPM 14. This is because, as a precondition, an information processing apparatus 1 basically uses its own TPM 14.

Initialization of the TPM

The recovering unit 110 temporarily initializes the TPM 14 because it is necessary to set the TPM 14 in accordance with the internal state of the TPM 14 of the information processing apparatus 1a, that is, the TPM internal key 42 (S54).

Recovery of the TPM

The recovering unit 110 recovers the initialized TPM 14 by using the backup TPM internal key 42 received from the information processing apparatus 1a (S55). The transmitting unit 108 transmits, to the information processing apparatus 1a, a response indicating that the request has been fulfilled (S56). Thus, the internal state of the TPM 14 of the information processing apparatus 1a may be reproduced.

Figure 7:
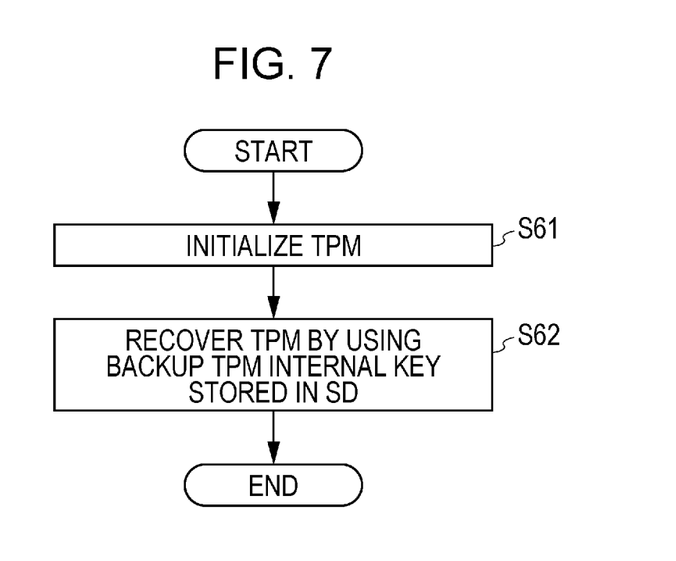
FIG. 7 is a flowchart of an exemplary operation performed when a TPM ownership release request is received from a different information processing apparatus, according to an exemplary embodiment.

FIG. 7 is a flowchart of an exemplary operation performed by a different information processing apparatus 1 (for example, the information processing apparatus 1b) having received the TPM ownership release request from the information processing apparatus 1a. In this case, the information processing apparatus 1b is an exemplary first information processing apparatus.

Initialization of the TPM

The recovering unit 110 temporarily initializes the TPM 14 to return the TPM 14 again to the state in which the information processing apparatus 1b exclusively uses the TPM 14 (S61).

Recovery of the TPM

The recovering unit 110 recovers the initialized TPM 14 by using the backup TPM internal key 42 stored in the SD card 4 mounted in the information processing apparatus 1b (S62).

Figure 8:
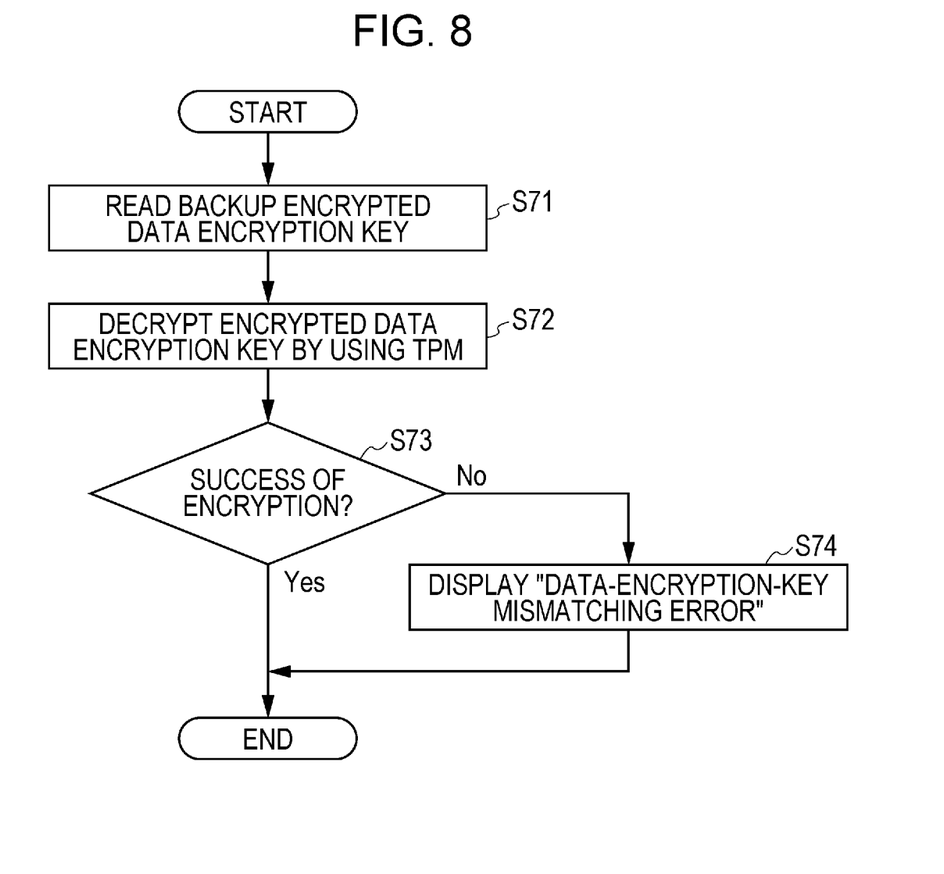
FIG. 8 is a flowchart of an exemplary decryption process performed by an information processing apparatus according to an exemplary embodiment.

FIG. 8 is a flowchart of an exemplary decryption process of the information processing apparatus 1a. Although the encrypted data encryption key 43 may be verified in start-up, another operation of checking the consistency of the key through encryption and decryption is necessary. In a case where invalid replacement with the HDD of a different apparatus is performed, this procedure causes the decryption to fail due to key mismatching.

The decryption unit 104 reads the encrypted data encryption key 43 from the SD card 4 (S71), and decrypts read encrypted data encryption key 43 by using functions of the TPM 14 (S72). The cryptographic processor 115 performs cryptographic processing on data in the HDD 2, and determines whether or not the cryptographic processing has been successfully performed (S73). If the cryptographic processing has been successfully performed (Yes in S73), the subsequent process may be continued. If the cryptographic processing has not been successfully performed (No in S73), the cryptographic processor 115 displays "data-encryption-key mismatching error" on the operation panel 5 (S74). The operation stopping unit 103 stops the subsequent operations of the information processing apparatus 1a.

Other Exemplary Embodiments

The exemplary embodiment of the present invention is not limited to the exemplary embodiment described above. Various changes may be made as long as the gist of the present invention is not changed. For example, in the exemplary embodiment described above, the TPM access key 151 generated from the apparatus specific information 150 is backed up to the SEEPROM 15. However, the backing-up operation is not necessary. In addition, addition, deletion, change, replacement, and the like of a step may be made in the flow according to the exemplary embodiment as long as the gist of the present invention is not changed. Further, the programs used in the exemplary embodiment described above may be provided by recording the programs in a computer-readable recording medium such as a compact disc-read-only memory (CD-ROM).

Programs

That is, the process performed by an information processing apparatus 1 according to the exemplary embodiments is prepared, for example, as a program such as application software.

A program for implementing the exemplary embodiments may be interpreted as a program for causing a computer to perform a process. The computer includes a key cryptographic processor that performs cryptographic processing on a data encryption key. The process includes performing cryptographic processing on data by using the data encryption key; setting a state of the key cryptographic processor in accordance with a request from an external apparatus, the state of the key cryptographic processor being set so as to accord with a state of the key cryptographic processor of the external apparatus; and obtaining, from the external apparatus, the data encryption key encrypted by the key cryptographic processor of the external apparatus, and causing the key cryptographic processor to decrypt the encrypted data encryption key, the key cryptographic processor having been set.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a key cryptographic processor that performs cryptographic processing on a data encryption key used in a cryptographic process on data; and
   a controller programmed to function as:
   a retaining unit that retains the data encryption key encrypted by the key cryptographic processor; and
   a key acquiring unit that transmits, to an external apparatus, the data encryption key encrypted and that acquires the data encryption key decrypted by the external apparatus; and
   a processor that performs cryptographic processing on data, the cryptographic processing being performed in such a manner that, when the key cryptographic processor decrypts the data encryption key, the data encryption key decrypted is used, and that, when the key cryptographic processor does not decrypt the data encryption key, the data encryption key acquired by the key acquiring unit is used,
   wherein, before a key cryptographic processor of the external apparatus attempts to decrypt the data encryption key, the key acquiring unit which acquires the data encryption key decrypted by the key cryptographic processor of the external apparatus requests the external apparatus to allow exclusive use of the key cryptographic processor of the external apparatus, and, when exclusive use of the key cryptographic processor of the external apparatus has not been fulfilled, the key acquiring unit detects whether another apparatus is present, and when the another apparatus is present, requests the another apparatus to allow exclusive use of a cryptographic processor of the another apparatus.

2. The information processing apparatus according to claim 1,
   wherein the key cryptographic processor is a trusted platform module.

3. The information processing apparatus according to claim 1,
   wherein, before a key cryptographic processor of the external apparatus decrypts the data encryption key, the key acquiring unit which acquires the data encryption key decrypted by the key cryptographic processor of the external apparatus requests the external apparatus to set a state of the key cryptographic processor of the external apparatus, the state of the key cryptographic processor of the external apparatus being set in such a manner that the state of the key cryptographic processor of the external apparatus accords with a state of the key cryptographic processor of the information processing apparatus.

4. The information processing apparatus according to claim 3,
   wherein the request to set the state of the key cryptographic processor of the external apparatus in such a manner that the state of the key cryptographic processor of the external apparatus accords with the state of the key cryptographic processor of the information processing apparatus includes a request to recover the key cryptographic processor of the external apparatus by using a key-encryption key included in the key cryptographic processor of the information processing apparatus.

5. The information processing apparatus according to claim 3,
   wherein, after the key cryptographic processor of the external apparatus decrypts the data encryption key, the key acquiring unit requests the external apparatus to return the state of the key cryptographic processor of the external apparatus to a previous state, the previous state being a state before the state of the key cryptographic processor of the external apparatus is set so as to accord with the state of the key cryptographic processor of the information processing apparatus.

6. The information processing apparatus according to claim 1,
   wherein the request for exclusive use of the key cryptographic processor of the external apparatus includes a request for recovery of the key cryptographic processor of the external apparatus, the recovery being performed by using a key-encryption key included in the key cryptographic processor of the information processing apparatus.

7. The information processing apparatus according to claim 1,
   wherein, after the key cryptographic processor of the external apparatus decrypts the data encryption key, the key acquiring unit requests the external apparatus to cancel the exclusive use of the key cryptographic processor of the external apparatus.

8. The information processing apparatus according to claim 1,
   wherein the key acquiring unit acquires the data encryption key decrypted by the external apparatus, through cryptographic communication established in advance.

9. An information processing apparatus comprising:
   key cryptographic processing means for performing cryptographic processing on a data encryption key used in a cryptographic process on data;
   retaining means for retaining the data encryption key encrypted by the key cryptographic processing means;
   key acquiring means for transmitting, to an external apparatus, the data encryption key encrypted, and acquiring the data encryption key decrypted by the external apparatus; and
   processor means for performing cryptographic processing on data, the cryptographic processing being performed in such a manner that, when the key cryptographic processing means decrypts the data encryption key, the data encryption key decrypted is used, and that, when the key cryptographic processing means does not decrypt the data encryption key, the data encryption key acquired by the key acquiring means is used,
   wherein, before a key cryptographic processor of the external apparatus attempts to decrypt the data encryption key, the key acquiring means which acquires the data encryption key decrypted by the key cryptographic processor of the external apparatus requests the external apparatus to allow exclusive use of the key cryptographic processor of the external apparatus, and, when exclusive use of the key cryptographic processor of the external apparatus has not been fulfilled, the key acquiring means detects whether another apparatus is present, and when the another apparatus is present, requests the another apparatus to allow exclusive use of a cryptographic processor of the another apparatus.

* * * * *